Figure 4:
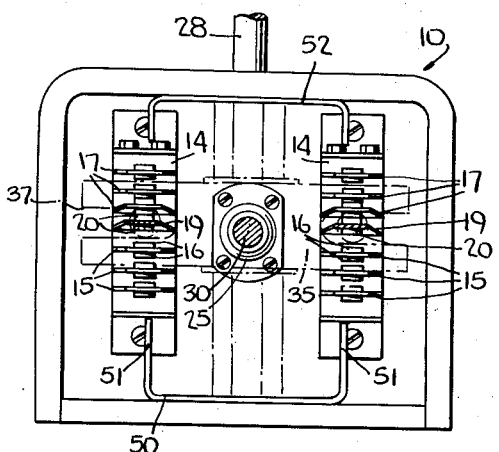

June 26, 1962 B. I. ULINSKI 3,040,828
CONTROLLER FOR INDUSTRIAL TRUCK
Filed July 23, 1959 4 Sheets-Sheet 1
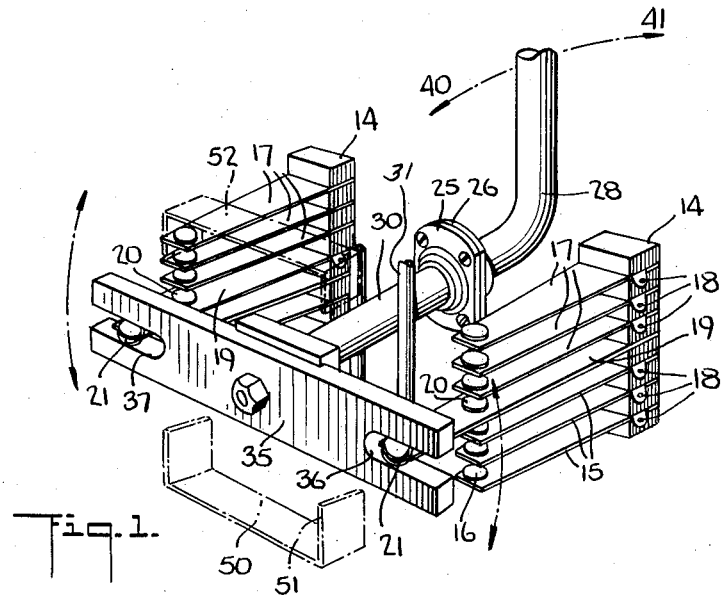
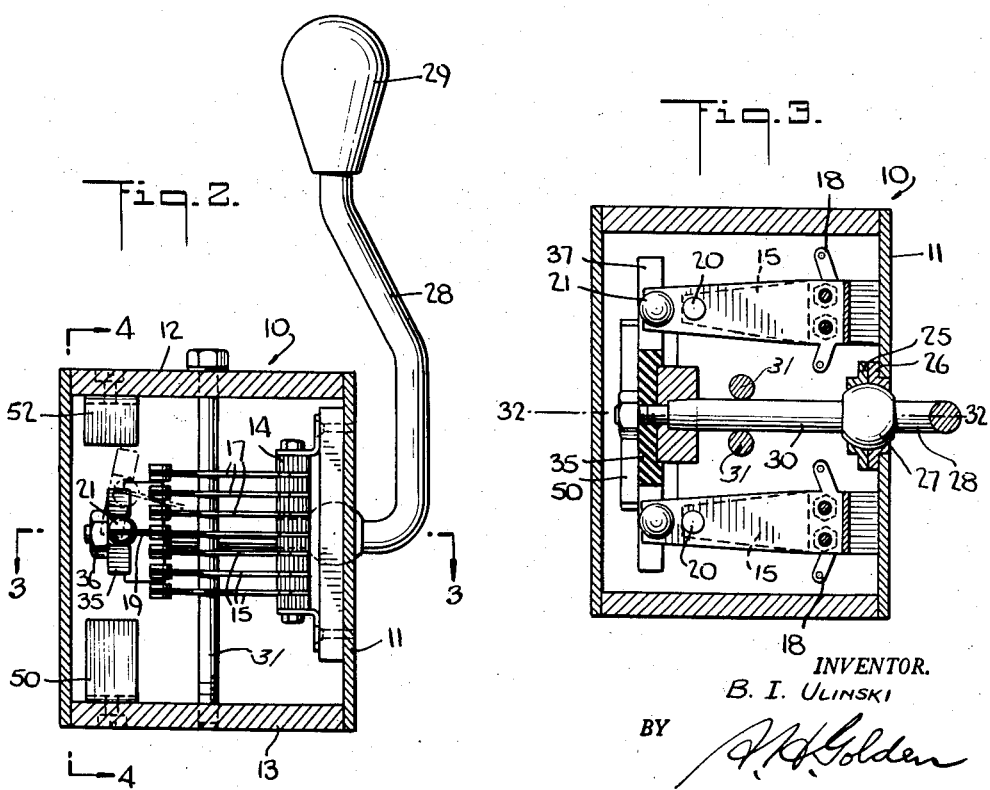
INVENTOR.
B. I. ULINSKI
BY
ATTORNEY June 26, 1962 B. I. ULINSKI 3,040,828
CONTROLLER FOR INDUSTRIAL TRUCK Filed July 23, 1959 4 Sheets-Sheet 2

*INVENTOR.*
B. I. ULINSKI
BY
ATTORNEY

June 26, 1962 B. I. ULINSKI 3,040,828
CONTROLLER FOR INDUSTRIAL TRUCK
Filed July 23, 1959 4 Sheets-Sheet 3

INVENTOR.
B. I. ULINSKI
BY
ATTORNEY

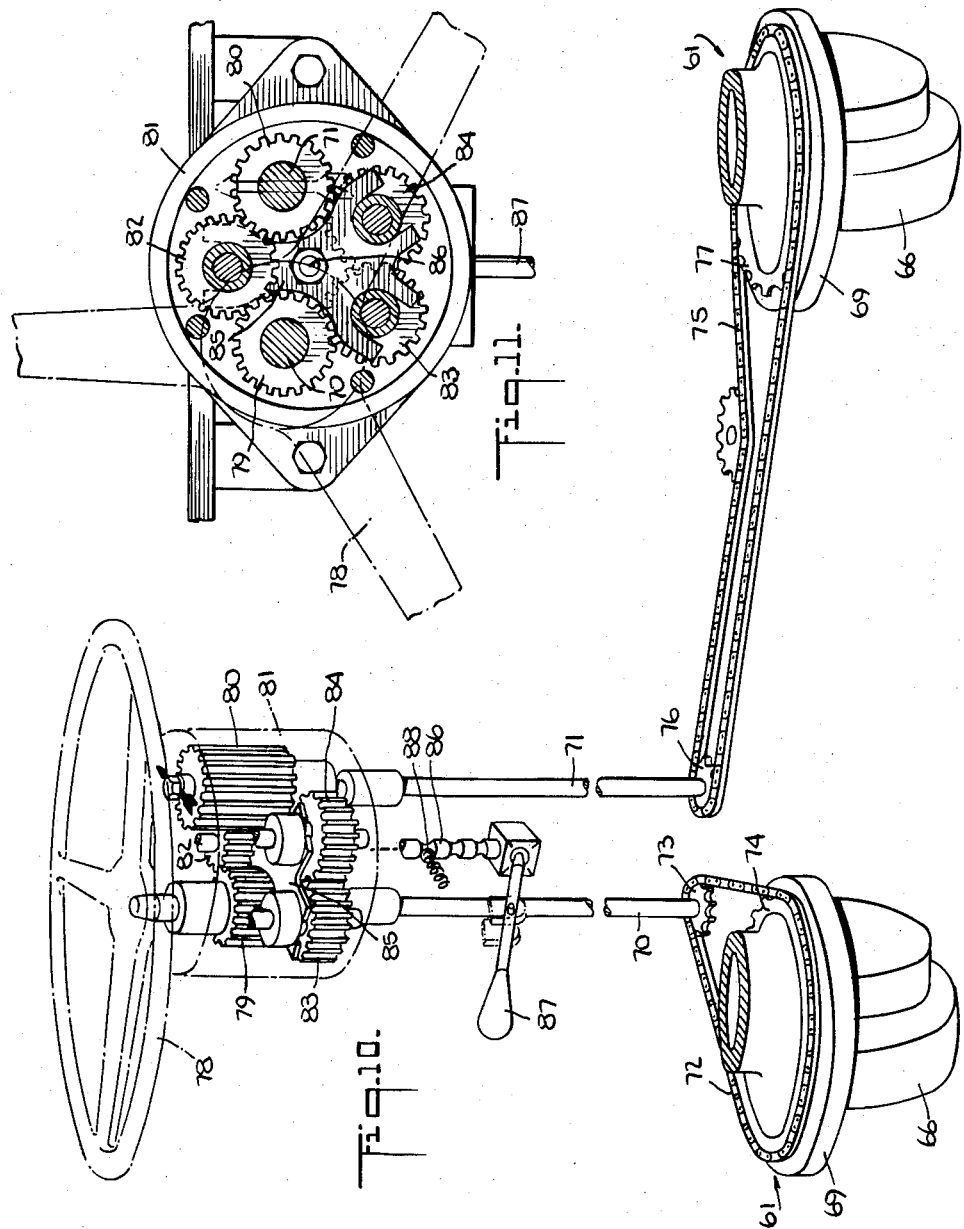

United States Patent Office 3,040,828
Patented June 26, 1962

3,040,828
CONTROLLER FOR INDUSTRIAL TRUCK
Bronislaus I. Ulinski, Flossmoor, Ill., assignor to the Yale and Towne Manufacturing Company, Stamford, Conn., a corporation of Connecticut
Filed July 23, 1959, Ser. No. 828,976
2 Claims. (Cl. 180—6.5)

This invention relates to a truck of the type discussed in my copending application Serial Number 829,111 filed July 23, 1959.

In the truck shown in my copending application there are two steering and traction units, each traction unit having a motor and a traction wheel driven by that motor. Further, each steering and traction unit is mounted for rotation bodily on the truck so that the truck may be steered. Means are provided for locking the steering and traction units against steering rotation.

As a feature of the invention of my copending application, the two traction motors are adapted to be controlled individually so as to drive the traction wheels at the same speed or at different speeds and in the same direction or in opposed directions. When one traction wheel is rotated faster than the other in the same direction, while the steering and traction units are locked against steering, the truck is steered in one direction or another. Further, if one traction wheel is rotated in one direction, and the other traction wheel is rotated in an opposed direction, it is obvious that the truck will rotate about a vertical axis.

In the truck of my copending application, there is the further feature that the steering means may steer by rotating the two steering and traction units in opposed directions relatively to each other. Rotation in opposed directions is necessary when the truck is to move in a direct sidewise or transverse direction, at which time the steering and traction units in effect are both at the same side of the truck. Then, in order that the truck may then be driven sidewise, the drive of one of the steering and traction units is reversed relatively to the other. For this reason, in my copending application I provide means for reversing the drive of one of the motors automatically when the steering apparatus rotates the steering and traction units from their locked position in opposed directions.

For controlling the two steering and traction motors of the truck of my copending application, I show in that application two controllers, their being one controller for each motor. The operator will therefore move one controller forwardly and the other rearwardly when he wishes to pivot the truck sharply, the steering and traction units being locked against steering rotation. On the other hand, when the steering and traction units are free for rotation in opposed directions and should there not be an automatic reversal of the motor drives, the operator again must move the two controllers in opposed directions so as to drive one traction wheel in one direction and the other traction wheel in a reverse direction.

In the present application, I particularly set forth a controller and truck combination conceived to make possible the use of a single controller for controlling the two motors of the truck of my copending application, for steering the truck when the steering and traction units are held against steering, with the very same controller being usable also to control the direction of drive of the truck when the steering and traction units are steered in opposed directions.

As a feature of the invention, the single controller utilizes a universally mounted lever which when moved forwardly with the traction units locked against steering, will drive both traction motors forwardly. The handle when moved rearwardly effects drive of both traction motors rearwardly. On the other hand, if the universally mounted lever moves to the left, it drives one traction motor forwardly and the other rearwardly so that the truck will turn in its own axis in one direction. If the universally mounted lever is moved to the right, the direction of turning of the truck will be reversed.

With the steering and traction units reelased for rotation, and being rotated by the steering mechanism in opposed directions, the movement of the universally mounted lever to the left will drive the truck to the left because the two drive motors have been reversed relatively to one another, with one rotating in one direction and the other in the opposed direction, so that the traction wheels actually rotate in the same direction relatively to the truck. The same is true when the universally mounted lever is moved to the right, except that the truck then moves to the right.

It follows, therefore, that through the utilization of a single controller particularly related to the truck set forth, I am able to effect steering of the truck with the steering and traction units locked against steering, and also able to effect proper directional control and drive when the steering and traction units are released for steering and are steered in opposed directions.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Figure 5:
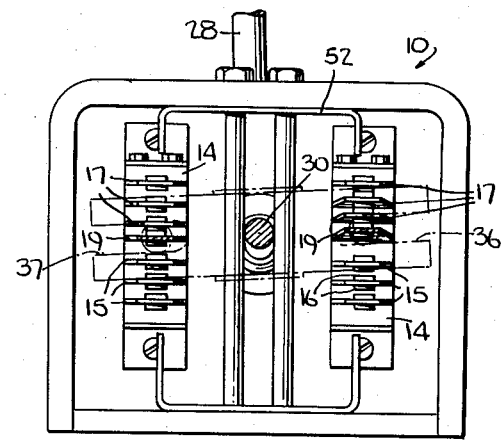
Figure 6:
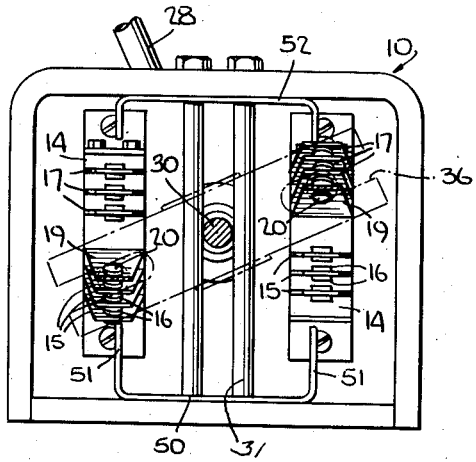
Figure 7:
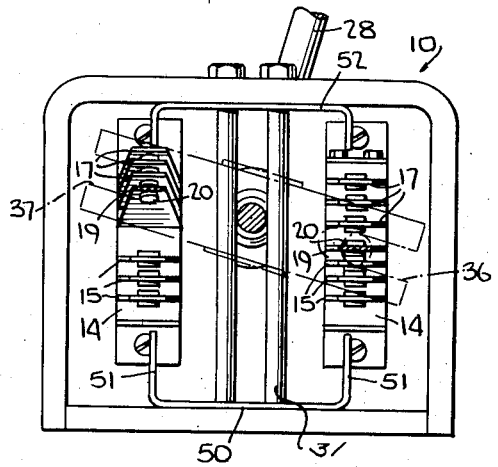
Figures 8, 9:
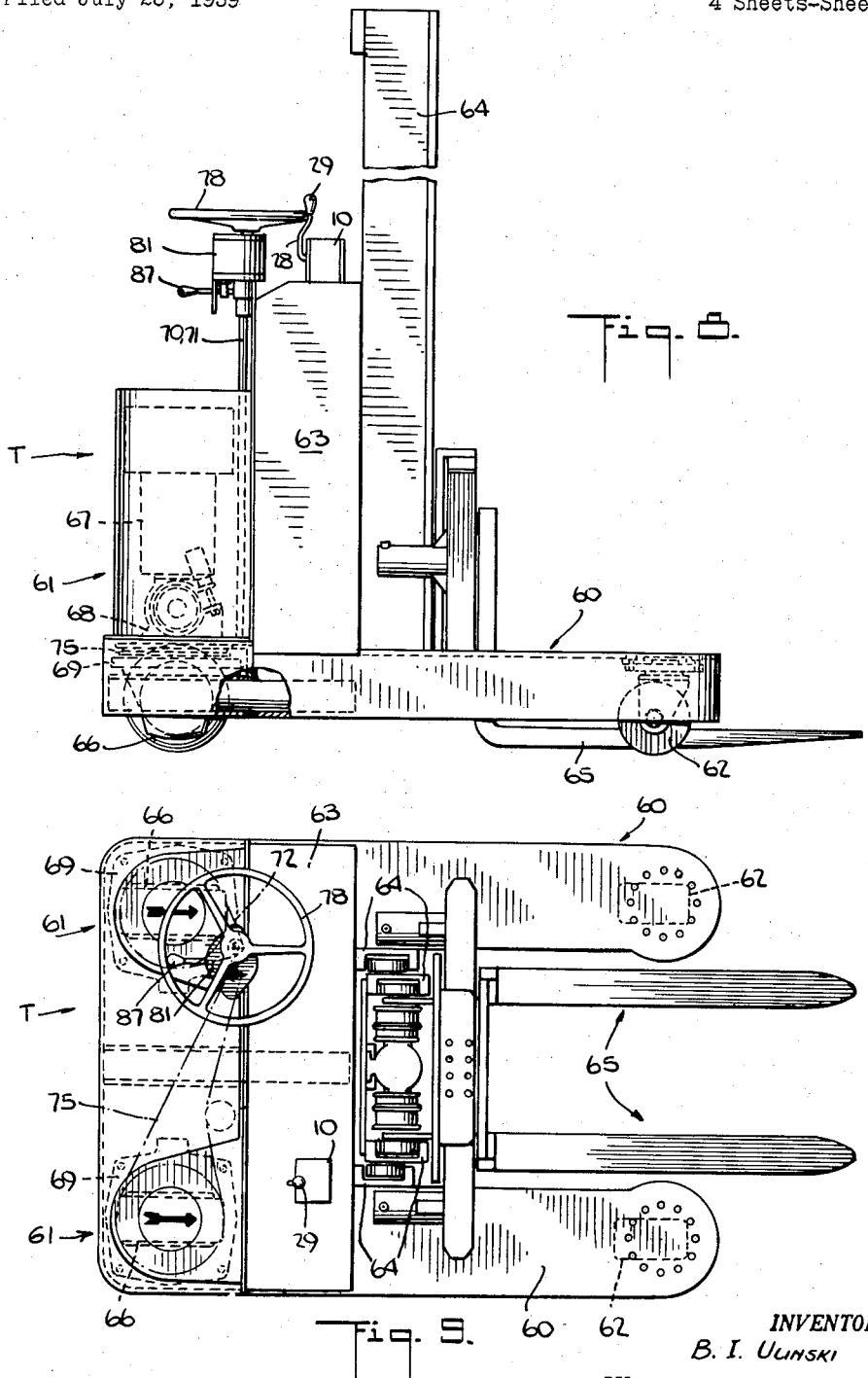

Referring now to the drawings, FIG. 1 is a partial perspective view of my controller showing the two series of circuit closing means, together with the operating handle and its operating means. FIG. 2 is a partial section and side view of the operating combination shown in FIG. 1 mounted in a casing. FIG. 3 is a section taken along line 3—3 of FIG. 2. FIG. 4 is a section taken along line 4—4 of FIG. 2. FIGS. 5, 6, and 7 are sections similar to FIG. 4 but with the operating member and circuit closing means in various positions. FIG. 8 shows my truck and controller combination. FIG. 9 shows a plan view of FIG. 8. FIG. 10 shows details of the steering mechanism of the truck. FIG. 11 shows a plan view of the gears shown in FIG. 10.

Referring now more particularly to the drawings, and especially FIGS. 1, 2, and 3, reference 10 indicates generally a controller casing having a back plate 11, an upper plate 12 and a lower plate 13. At each side of the back plate there is mounted an insulation block 14. Suitably secured to the right-hand insulation block is a series of three lower fingers 15, the fingers each being formed of a suitable flexing and conducting material, and each finger being further equipped with upper and lower contact making discs 16. At the upper end of each insulation block 14 there is a similar series of fingers 17 of exactly the same construction as the fingers 15.

It will be well also to indicate that each of the fingers 15 and 17 is equipped with an ear 18 to which may be secured a suitable electric conducting wire. Between the upper and lower series of fingers 15, 17 there is a relatively longer operating finger 19 equipped with upper and lower contact making discs 20 for co-acting with the next immediate contact making discs 16 of the fingers 15, 17. Finger 19 is further formed with a rounded or dome-shaped abutment 21, the function of which will be made clear shortly.

It may thus be said at each side of the casing 10, there are two series of circuit closing means in the form of spring-like members equipped with contact making surfaces and controlled by a central operating spring leaf. Those series of circuit closing means actually contribute four controller portions, each adapted to control one direction of drive of one of two traction motors.

Between the two insulating members 14 there is secured to the back plate 11 of my casing a suitable bearing formed of two like members 25 and 26, as best shown in FIGURE 3. Carried by these two bearing members 25, 26 is a generally ball-shaped portion 27 formed integral with a handle 28 to which is secured an operating knob 29 as shown in FIGURE 2. The handle 28 has a horizontally extending arm 30 that is confined between two vertical rods 31 secured to the upper and lower plates 12, 13 of the casing 10. Because of these rods, the arm 30 is free for movement in a vertical plane between the rods as is quite apparent. In addition, the arm 30 may rotate on the axis of line 32—32 shown in FIGURE 3, this line 32—32 being the central axis of the arm 30, and moving with the arm 30 as will be made apparent shortly.

Fixed to the extreme end of the arm 30, as is clearly shown in FIGURES 1, 2, and 3, is a transverse bar 35. Bar 35 is slotted at 36 and 37 for cooperation with the dome-shaped portions 21 of the two operating leaves 19. Obviously, movement of the bar 35 will effect movement of the leaves 19 through the portions 21. It will further be obvious that since the arm 30 may rotate on its axis 32, 32, as is illustrated by the arrows in FIG. 1. One leaf 19 may be flexed in one direction while the other leaf 19 is flexed in an opposed direction.

I shall now, particularly with reference to FIGS. 2 and 4 to 7 inclusive, indicate just how the operation of handle 28 by knob controls the operation of the several contact leaves 15, 17. In FIG. 2 as in FIG 1, the handle 28 is in a neutral position with the two operating spring leaves 19 separated from the leaves 17 and 15 immediately above and below the operating leaves 19. It is quite obvious that if simple pivoting movement is now contributed to the handle 28, as illustrated by arrows 40, 41 in FIG. 1, the insulation bar 35, will through its slots 36, 37 move both spring leaves 19 upwardly or downwardly in unison. If this is done, then the initial movement of the bar 35 will through the spring leaves 19 first bring about the closing of a circuit between contact discs 20 of the spring leaves 19 and the contact discs 16 of the contact leaf 15 or 17 immediately below or above the spring leaf 19. In FIG. 4, the handle has been moved slightly to bring contacts 20 against the lowermost contact discs 16 of lowermost leaves 17.

Further movement of the handle 28 in the same manner will gradually bring about an engagement of all of the contact discs 16 of the spring leaves either above or below operating leaves 19 as will be quite apparent. Naturally, in accordance with well-known operating principles of electric industrial trucks, the movement of the operating leaves 19 as described will bring about a step-like elimination of traction resistance to increase the driving speed of the industrial truck. Thus, when each operating spring leaf 19 contacts the first leaf 17 above it, the truck will be moved into first speed with all of the traction resistance in the traction circuit. As the next leaf is contacted some of the resistance will be shunted out of the circuit. When the leaf thereabove is contacted an additional portion of the resistance will be shunted out of the circuit and so on. This type of control, where applied to a single motor, is well illustrated in my earlier Patent No. 2,790,879 where is shown the leaf construction, per se of my controller.

As I have already indicated, the spring leaves 15, 17 and 19 comprise four controller portions that in my invention control two traction motors on an industrial truck. So that my invention may be fully understood, I show in FIGS. 8 and 9 a truck T like that disclosed in my copending application Serial No. 829,111, to which I referred earlier. The truck T has a main frame 60 that is supported at its rear end on a pair of right-hand and left-hand steering and traction units 61, and at its front end on a pair of casters 62 that are mounted for free steering movement. Upon the main frame 60 are mounted a rather usual battery compartment 63, and uprights 64 on which move lifting forks 65.

Each steering and traction unit 61 is equipped with a traction wheel 66 driven by a traction motor 67 that acts through gears in a gear casing 68, indicated in dotted lines in FIG. 8. Also, each steering and traction unit 61 is mounted through a bearing assembly 69 for individual steering rotation on the truck frame 60. The steering and traction units 61 are steered through a pair of shafts 70, 71 that are best seen in FIG. 10. The shaft 70 is connected by a chain 72 and sprockets 73, 74 to the left-hand steering and traction unit 61, while the steering shaft 71 is connected by a chain 75 and sprockets 76, 77 to the right-hand steering and traction unit 61.

A manual steering wheel 78 is adapted to rotate the steering shafts 70, 71, with the rotation controlled through the shifting of gears as in my copending application. Thus, there are two gears 79, 80 mounted in a housing 81, FIGS. 10 and 11, each gear rotating integrally with a corresponding steering shaft 70 or 71. The manual wheel is fixed relatively to gear 79 for directly rotating shaft 70. The gears 79, 80 are relatively long in an axial direction, and gear 80 is somewhat offset vertically, relatively to gear 79. There are also three relatively short gears 82, 83, 84 mounted for vertical shifting movement, the shifting being effected through a fork plate 85 engaged with a collar on each gear 82, 83, 84.

When those gears are shifted to their lowermost positions, as shown in FIG. 10, gear 82 meshes with both of the long gears 79, 80, but gear 84 is free relatively to long gear 80. If the manual wheel 78 now is rotated, the two steering and traction units will steer in the same direction. When fork plate 85 shifts gears 82, 83, 84 to their uppermost positions, gear 82 will be free relatively to long gear 79, but gear 84 will mesh with long gear 80. Since gear 84 is meshed with gear 83, which in turn is always meshed with long gear 79, a rotation of manual wheel 78 now will steer both units 61 in opposed directions.

Moreover, when fork plate 85 places gears 82, 83, 84 in an intermediate position, the gears 82, 84 will mesh each with its corresponding long gear 79, 80, locking the steering so that units 61 cannot rotate on their mountings, and holding traction wheels 66 in fixed steering positions. For shifting the fork plate 85, I show a rod 86 that may be actuated through a handle 87. A spring pressed detent 88 is adapted to engage grooves in the rod 86, acting through the rod to hold the gears in their upper, lower, and locking positions.

Thus, depending upon the position to which the handle 87 is actuated, the gears in the housing 81 will enable the steering wheel 78 to rotate the traction wheels 66 either in the same direction, or in opposed directions relatively to each other, or alternately will lock the steering. By the steering of the wheels 66 in opposed directions, it is possible to achieve a sidewise movement of the truck, and to steer the truck while moving sidewise. When the wheels 66 are locked in positions that are aligned with the longitudinal axis of the truck, or steered in the same direction to oblique positions relatively to the truck, particular operation of the traction motors 67 may cause the truck to steer towards one side or the other, or actually to pivot, all as described in my copending application.

I shall now describe the manner in which the controller set forth in this application will control the traction motors 67 of my truck. Through the mounting of the controller handle 28, FIG. 3, I am able to obtain a rotation of the arm 30 of the handle 28 in its axis 32, 32. When the handle is so rotated, as shown particularly in FIGS. 5 to 7, it is possible to close circuits through the right-hand or left-hand controller portions or series of contacts 15, 17 in any desired manner. Thus, as seen in FIG. 5, the rotation of the bar 35 has moved the right-hand spring leaf 19 to close a circuit through the upper series of contacts 17 at the right-hand side of the controller. No circuits are closed at the left contacts. This means that one of the motors 67 of the two traction units 61 will be excited to rotate its traction wheel 66, while the other traction wheel 66 is stationary. In other words, it is very simple indeed to operate the control handle 28 so as to bring about a movement of one traction wheel while the other traction wheel remains stationary.

It will be quite apparent further that should the handle 28 be operated to close a circuit through all of the contact discs 16 of the three spring leaves 17 at the right side, it will still be possible to move the left-hand spring leaf 19 to close a circuit through perhaps only the nearest contact thereto at the left-hand side. This would mean that the motor 67 controlled by the left series of contacts will operate at a lower speed than the motor 67 that is controlled by the right-hand series of contacts.

In FIGURE 6 the arm 30 and the bar 35 have been rotated so as to bring together all of the contact discs 16 of the lower series of spring leaves 15 at the left side of the controller. At the same time, all of the contact discs 16 of the right-hand series of spring leaves 17 have been brought into engagement. Now, the motor 67 of one traction unit 61 is driving at full speed in one direction while the motor of the other traction unit is driving at full speed in the opposed direction.

In FIGURE 7 the handle 28 has been moved so as to rotate the bar 30 in a manner to bring about a contacting of all of the contact disc surfaces 16 of the spring leaves 17 of the left series. At the same time, only the contact disc 20 of the operating leaf 19 and the contact disc 16 of the uppermost leaf 15 of the right-hand series have been brought into engagement. This means that the motor 67 of the left traction unit 61 is being driven at full speed in one direction while the right-hand motor is being driven at a lower speed in an opposed direction.

It will be obvious now that through the construction I have shown and described, the handle 28 is adapted to bring about almost any type of control of the two traction motors 67. In other words, the motors 67 may be operated at the same speed in the same direction or in opposed directions. If desired, the motors may be operated in the same direction but at different speeds. In addition, the motors may be operated in opposed directions at the same speed or at different speeds.

In order to assist the operator in the operation of the controller, I prefer to utilize an aligning device which may take the form of a simple U member best illustrated in FIGURE 1 and there designated by reference 50. The function of this aligning device is to bring the bar 35 into a horizontal position when the bar is moved downwardly into contact with the legs 51 of the U member 50. This will bring about an equalizing of the position of both ends of the bar 35, and therefore will cause both traction motors 67 to operate at the same speed. A similar U member 52 is mounted at the upper end of the casing 10 as best illustrated in FIGURES 2 and 7.

I believe the merits of my invention will now be quite apparent to those skilled in the art.

I now claim:

1. In a truck of the class described, a pair of independent steering and traction units each having an electric drive motor and a traction wheel, means mounting each of said traction wheels bodily for individual steering rotation on the truck on a substantially vertical axis, means for locking each traction wheel against steering rotation with both said traction wheels positioned in alignment with the longitudinal axis of the truck and adapted also to release said traction wheels for free steering rotation, controller means for said motors, a universally mounted handle on said controller means, said controller means including forward contacts actuated individually for driving both motors forwardly when said handle is moved forwardly and rearward contacts actuated indivdually for driving both motors rearwardly when said handle is moved rearwardly, whereby with said steering wheels locked against steering rotation the drive of said motors together forwardly and rearwardly will drive said truck forwardly and rearwardly, said handle coacting simultaneously with a forward and a rearward contact of said controller means to effect drive of one of said motors forwardly and the other of said motors rearwardly when said handle is moved to one side or to the other side whereby with said steering and traction units remaining locked, said motors will drive the truck in a circular path in one direction or in an opposed direction, steering means for rotating said steering wheels in opposed directions on their mounting into alignment with the transverse axis of the truck and to steer the truck in a generally transverse direction sidewise of the truck when said steering wheels are unlocked by said locking means for free steering rotation, and said sidewise movement of said handle relatively to said controller means driving said motors in opposed directions also when said steering wheels are steered in opposed direction sidewise of said truck whereupon the effect of said opposed directional drive of said motors will be to effect sidewise driving movement of said truck by both motors in one direction as to the left, when the handle is moved to the left, and in a reverse direction to the right when the handle is moved to the right.

2. In a truck of the class described, a pair of independent steering and traction units each having an electric drive motor and a traction wheel, means mounting each of said traction wheels bodily for individual steering rotation on the truck on a substantially vertical axis, means for locking each traction wheel against steering rotation with both said traction wheels positioned in alignment with the longitudinal axis of the truck and adapted also to release said traction wheels for free steering rotation, controller means for said motors, a universally mounted handle on said controller means, said controller means including forward contacts actuated for driving both motors forwardly when said handle is moved forwardly and rearward contacts actuated for driving both motors rearwardly when said handle is moved rearwardly, whereby with said steering wheels locked against steering rotation the drive of said motors together forwardly and rearwardly will drive said truck forwardly and rearwardly, said handle actuating simultaneously forward and rearward contacts of said controller means to effect drive of one of said motors forwardly and the other of said motors rearwardly when said handle is moved to one side or to the other side whereby with said steering and traction unit remaining locked, said motors will drive the truck in a circular path in one direction or in an opposed direction, steering means for rotating said steering wheels in opposed directions on their mounting into alignment with the transverse axis of the truck and to steer the truck in a generally transverse direction sidewise of the truck when said steering wheels are unlocked by said locking means for free steering rotation, and said sidewise movement of said handle relatively to said controller means driving said motors in opposed directions also when said steering wheels are steered in opposed directions sidewise of said truck whereupon the effect of said opposed directional drive of said motors will be to effect sidewise driving movement of said truck by both motors in one direction as to the left, when the handle is moved to the left, and in a reverse direction to the right when the handle is moved to the right.

(References on following page)

References Cited in the file of this patent

UNITED STATES PATENTS

| | | |
|---|---|---|
| 1,283,211 | Kintzing | Oct. 29, 1918 |
| 1,407,969 | Wickersham | Feb. 28, 1922 |
| 1,716,373 | Ellis | June 11, 1929 |
| 1,863,504 | Schmid | June 14, 1932 |
| 2,141,920 | Lenhart | Dec. 27, 1938 |
| 2,391,881 | Clay | Jan. 1, 1946 |
| 2,544,831 | Guyton | Mar. 13, 1951 |
| 2,545,172 | Sensinger | Mar. 13, 1951 |
| 2,565,293 | Aydelott et al. | Aug. 21, 1951 |
| 2,650,100 | Ronning | Aug. 25, 1953 |
| 2,715,534 | Hoge et al. | Aug. 16, 1955 |
| 2,798,565 | Rosenthal et al. | July 9, 1957 |
| 2,913,063 | Brown | Nov. 17, 1959 |